United States Patent [19]

Bourret

[11] Patent Number: 4,987,965
[45] Date of Patent: Jan. 29, 1991

[54] SNOWMOBILE SUSPENSION

[75] Inventor: Michel Bourret, Drummondville, Canada

[73] Assignee: Bombardier Inc., Canada

[21] Appl. No.: 503,687

[22] Filed: Apr. 3, 1990

[30] Foreign Application Priority Data

Jan. 17, 1990 [CA] Canada .................................. 2007916

[51] Int. Cl.$^5$ ..................... B62D 55/108; B62M 27/02
[52] U.S. Cl. ..................:............................ 180/193; 180/9.56; 180/9.58
[58] Field of Search ...................... 180/9.5, 9.52, 9.54, 180/9.56, 9.58, 9.25, 193, 190; 305/28, 27, 22, 31

[56] References Cited

U.S. PATENT DOCUMENTS 3,761,144  9/1973  Perreault ............................... 180/193
3,863,727  2/1975  Michrina ................................ 180/9.5

Primary Examiner—Charles A. Marmor
Assistant Examiner—Paul Dickson
Attorney, Agent, or Firm—Larson and Taylor

[57] ABSTRACT

In a snowmobile track suspension the slide frame that contacts the ground-engaging run of the track belt is carried on front and rear suspension arm assemblies. The front suspension arm assembly is pivoted to the vehicle on the axis of the sprocket drive shaft. The rear suspension arm assembly is articulated, having upper and lower sections that are rearwardly angled and pivotally interconnected and support in the region of the pivotal interconnection the idler wheel that maintains the track under tension. The arrangement eliminates stretching of the track and lengthens the track life. Furthermore the rearwardly angled arrangement of the rear suspension arm assembly allows easier backward motion of the snowmobile because the lower arm section provides an angle of attack to help the track rise above an obstacle.

7 Claims, 5 Drawing Sheets

SNOWMOBILE SUSPENSION

BACKGROUND OF INVENTION

1. Field of Invention

This invention relates to improvements in snowmobiles, and more particularly to and improved snowmobile suspension system.

2. DESCRIPTION OF THE PRIOR ART

Snowmobile track suspensions commonly employ a sliding frame having transversely spaced longitudinal rails coated with low-friction material for contact with the ground-engaging run of the track belt. The slide frame is typically connected to the snowmobile frame by pivotally attached front and rear suspension arm assemblies, suitable arrangements of springs and hydraulic dampers being provided to control deflections of the suspension system. The tension in the track belt is controlled by means of an idler wheel assembly that is adjustably mounted at the rear end of the slide frame, and that can be moved by means of threaded adjusters to increase or reduce the track belt tension. The suspension arm assemblies may be in various configurations, and it is known to provide the rear suspension arm assembly in articulated form. Examples of such snowmobile track suspension systems can be seen in our Canadian Patent No. 1,150,752 and 1,228,884.

SUMMARY OF THE INVENTION

The present invention provides a snowmobile comprising a frame having a forward portion supported on steerable ski means and a rearward portion support on a track belt, said track belt following an endless loop that passes over a forwardly arranged drive sprocket means, through a lower, ground-engaging run to a rearwardly located idler wheel means, and back to the drive sprocket means through an upper return run, said snowmobile including:

a track suspension formed by a elongate slide frame engaging said lower run of the track belt;

a front suspension arm assembly pivotally connected between a forward portion of said slide frame and the snowmobile frame;

a rear suspension arm assembly pivotally connected between the snowmobile frame and a rearward location on said slide frame;

springs acting on said forward and rear suspension arm assemblies to urge said slide frame downwardly;

wherein said rear suspension arm assembly comprises rearwardly angulated upper and lower sections that are pivotally interconnected at their adjacent ends and are pivoted at their opposite ends to the snowmobile frame and the slide frame respectively, said idler wheel means being supported on said rear suspension arm assembly to rotate on an axis in the area of the pivotal interconnectional said upper and lower sections thereof.

The front suspension arm assembly is preferably pivoted about the axis of the drive sprocket shaft, and the idler wheel means preferably rotates on a shaft that forms the pivotal interconnection of the upper and lower sections of the rear suspension arm assembly. This arrangement eliminates or at least minimizes stretching of the track during suspension movements, which leads to less wear and a longer track life. Slippage of the drive sprocket which occurs with some standard suspensions is reliably avoided.

The rearward inclination of the lower section of the rear suspension arm assembly provides the associated region of the track with an angle of attack that facilitates rearward movement of the snowmobile and in particular when an obstacle is encountered assists the track to climb over the obstacle rather than merely pushing against it.

The arrangement enables an overall simplification of the track suspension structure as compared to known designs leading to reduced weight and lower costs. With the reduced weight there is achieved a faster response time by virtue of the reduction in the non-suspended weight.

BRIEF DESCRIPTION OF THE DRAWINGS

The invention will further be described, by way of example only, with reference to the accompanying drawings wherein.

DESCRIPTION OF THE PREFERRED EMBODIMENTS

Figure 1:
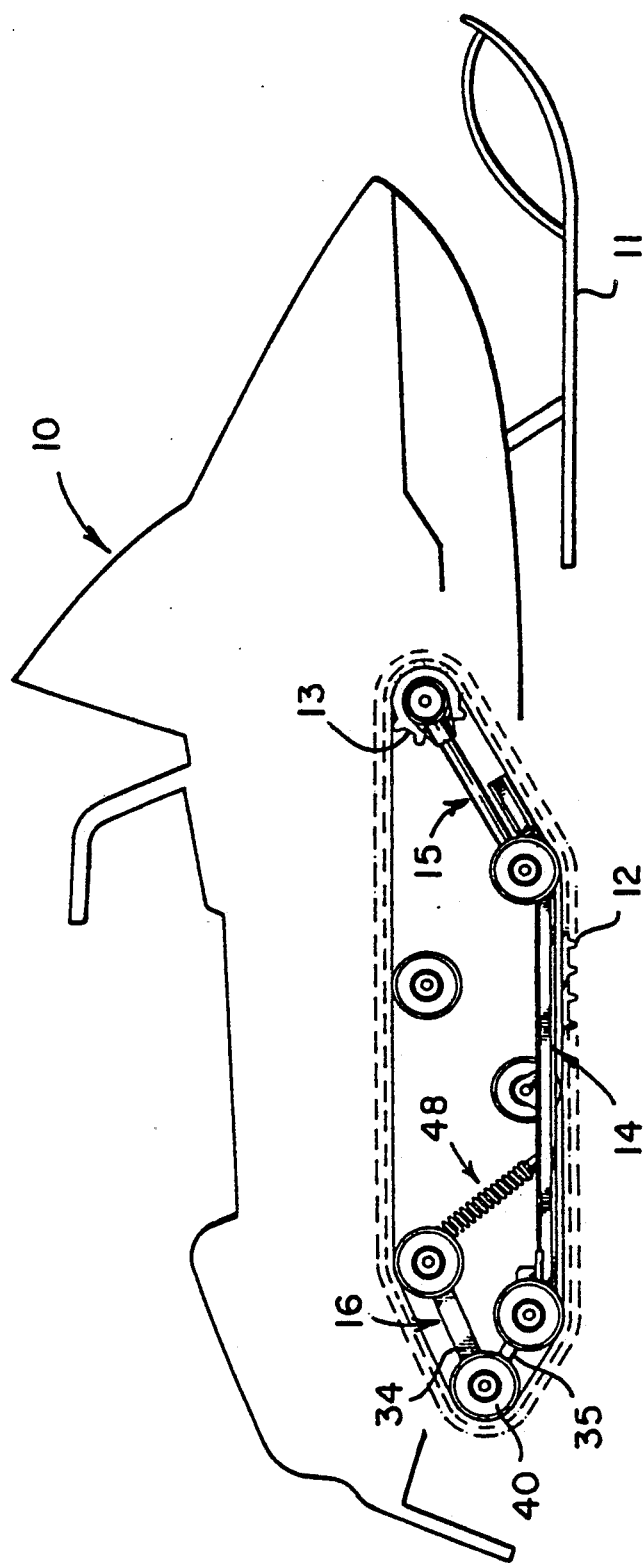
FIG. 1 is a somewhat schematic side elevational view of a snowmobile embodying the improved suspension.

As shown schematically in FIG. 1, a snowmobile 10 is supported at its forward end on one or more steerable skis 11, and at its rear end is supported through a suspension arrangement on a ground-engaging drive track 12. The track 12 is driven in known manner through a sprocket arrangement 13 rotatably supported in the snowmobile and connected through suitable transmission means to an engine. The transmission means and engine are not illustrated herein since they form no part of the present invention.

Figure 2:
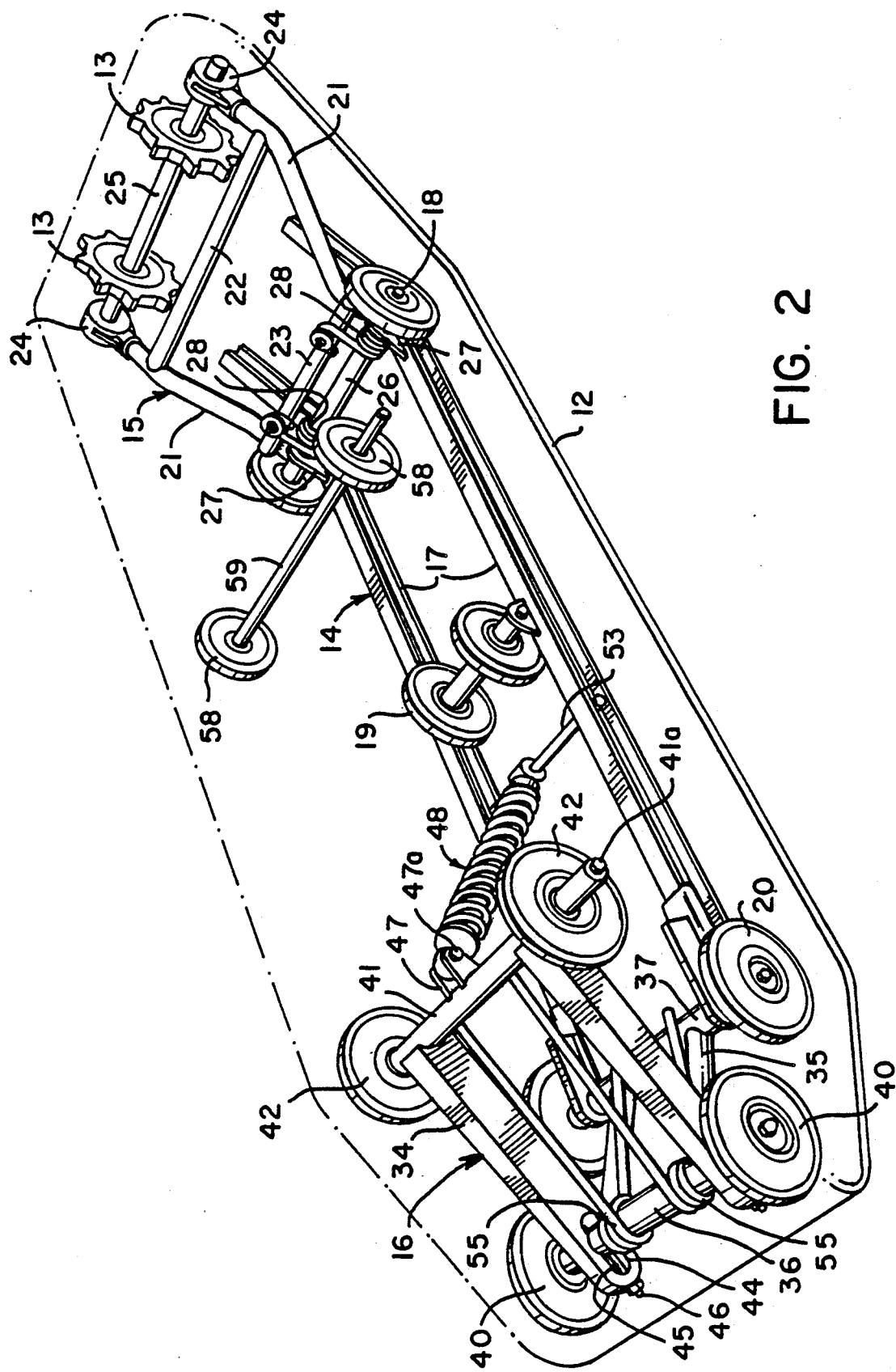
FIG. 2 is a fragmentary perspective view illustrating the suspension detached from the snowmobile.
Figure 3:
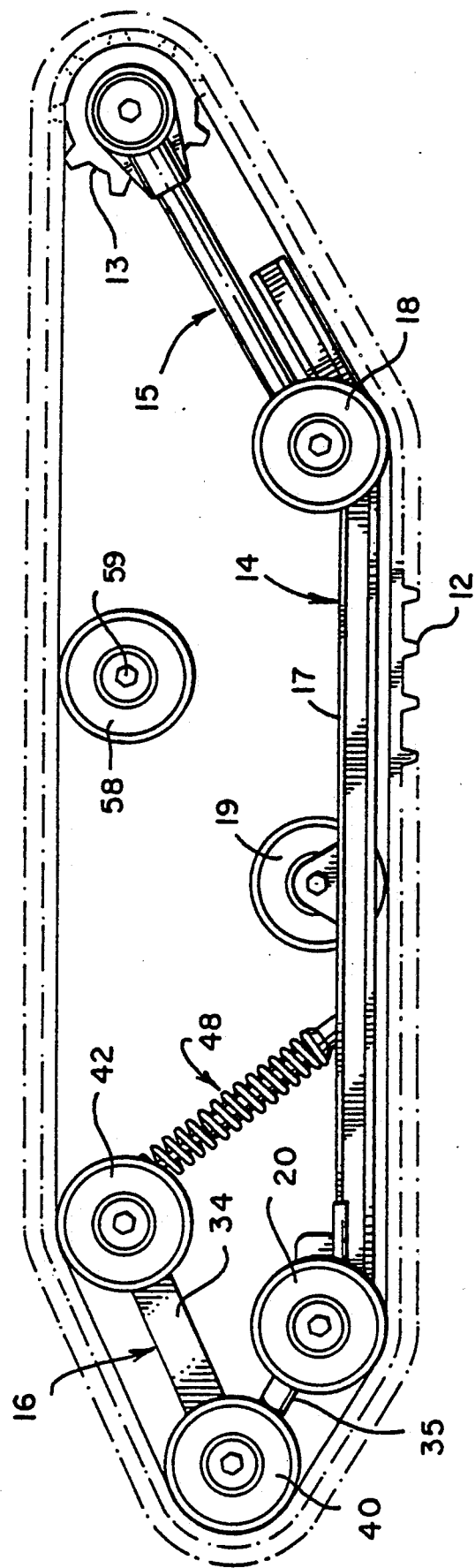
FIG. 3 is a side elevation of the suspension system.

As is more clearly seen in FIGS. 2 and 3, the suspension arrangement comprises a slide frame 14 that is connected to the vehicle through front and rear suspension arm assemblies 15 and 16 respectively. The slide frame comprises two longitudinally extending transversely spaced slide rails 17 that are transversely interconnected by suitable cross shafts to form a generally rigid structure, the lower surfaces of the slide rail being coated in known manner with suitable low friction material such as nylon or Teflon (Trade-mark) for sliding contact with the track belt 12. To further reduce frictional contact between the belt and the slide frame, the latter carries pairs of laterally spaced idler rollers 18, 19 and 20 at its forward end, center, and rear end, respectively.

Figure 6:
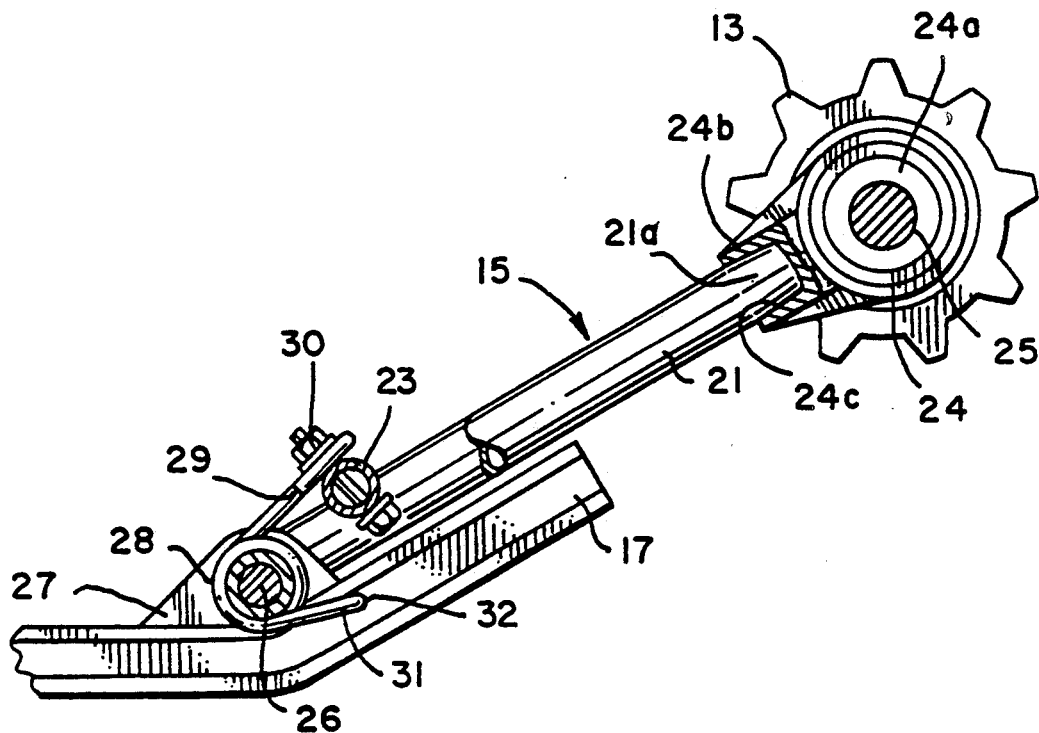
FIG. 6 is a longitudinal section view of the front suspension arm arrangement.

The front suspension of assembly is of welded tubular steel construction and comprises two lateral limbs 21 that are spaced by transversed tubes 22, 23. The forward upper end each lateral limb 21 is connected to a bearing housing 24 in which is rotatably received a drive shaft 25 which is fixed to rotate with the drive sprockets 13. In know manner the drive sprocket shaft 25 is rotatably mounted in the walls of the track tunnel of the vehicle and is drivingly coupled to the engine of the vehicle by a suitable transmission (not shown). As is best seen in FIG. 6, each bearing housing 24 is of annular form and carries a bearing 24a which slidingly engages the shaft 25. The housing is suitably fabricated as a molding in ultra high molecular weight (UHMW) polymer and has a radially projecting part 24b that forms a slightly tapered cylindrical socket 24c to receive with a friction fit the upper end 21a of the associated limb 21 of the arm assembly 15. At its rear lower end the arm assembly 15 carries a transverse shaft 26 which is pivotally received in brackets 27 on the respective slide rails 17 to form a pivotal attachment between the front suspension arm assembly 15 and the slide frame 14. Both ends of the shaft 26 project lateral beyond the respective bracket 27 and form a bearing for the idler rollers 18.

As best seen in FIGS. 2 and 6 spring means are provided to act upon the front suspension on assembly 15 to urge the slide frame 14 downwardly into engagement with the ground engaging run of the track belt 12, these springs means being in the form of a pair of coiled torsion springs 28 encircling the shaft 26, each spring having one end 29 anchored to the transverse tube 23 by a threaded fastener arrangement 29, and an opposite end 31 engaged in a hole 32 in the associated slide rail 17. The springs 28 are arranged in a state of compression to urge the front end of the slide frame 14 downwardly.

Figure 5:
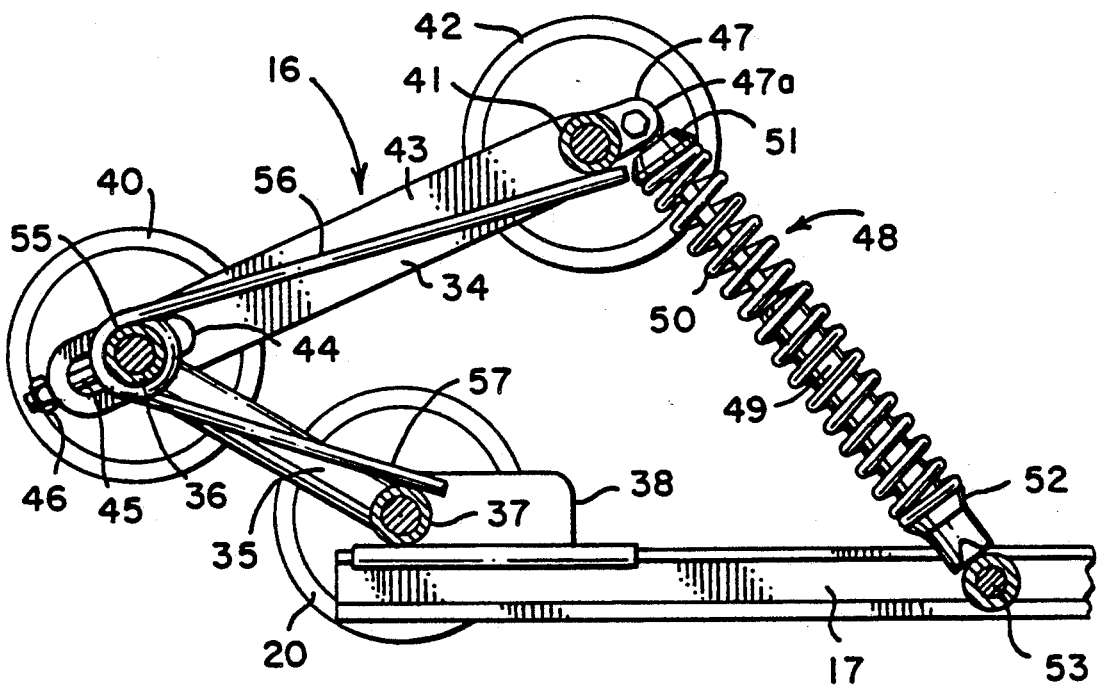
FIG. 5 is a longitudinal sectional view of the rear suspension arm arrangement.

The rear suspension arm assembly is best shown in FIGS. 2 and 5 and comprises rearwardly angulated upper and lower sections 34, 35 that are pivotally interconnected. As can be seen from FIG. 2, the lower section 35 comprises a pair of spaced transverse tubes 36, 37, the lower tube 37 being pivotally mounted in brackets 38 on the slide rails 17, and the outboard ends of this tube forming bearings for the mounting of the rear idler rollers 20. The upper transverse tube 36 has outboard ends that form bearings to rotatably mount a pair of tensioning idler rollers 40.

The upper section 34 of the rear suspension arm assembly 16 comprises a transverse horizontal upper tube 41 pivotally attached in the frame of the snowmobile 10 by means of capscrews 41a and forming a rotary mounting for a pair of upper idler rollers 42. The upper section 34 also includes a pair of trailing arms 43 fixed to the tube 41 and extending angularly downwardly and to the rear thereof. Near its lower end each of these arms 43 is formed with a elongate slot 44 through which a respective end of the upper transverse tube 36 of the lower frame section 35 extends with clearance. Within each slot 44 is located an adjustment screw 45 attached at one end to the tube 36 and extending longitudinally of the slot 44 and through the end of the trailing arm 43 beyond which it is engaged by an adjusting nut 46. It will be clear that by rotation of the adjustment nuts 46 on their screws 45, the position of the shaft 36 can be adjusted longitudinally of the slot 44.

Attached to the tube 41 and projecting to the side opposite to the trailing arms 43 is a mounting bracket 47, a threaded fastener 47a attaching this bracket to the upper end of a shock absorber assembly which comprises a hydraulic piston and cylinder assembly dampener 49 enclosed by a coiled compression spring 50. As shown in FIG. 5 the spring 50 is held in compression between an upper seat 51 adjacent the bracket 47 and a lower seat 52 near the lower end of the dampener The lower seat 52 is adjustable longitudinally of the dampener 49 in known manner so that preload in the spring can be adjusted. The shock absorber assembly 48 is positioned centrally and is pivoted at its lower end on a shaft 53 that extends between the slide rails 17.

A pair of additional torsion springs 55 are coiled around the tube 36 and have arms 56, 57 extending radially from opposite sides thereof. The upper arm 56 is engaged against the underside of the upper tube 41 whereas the lower arm 57 presses against the upper side of the tube 37.

Between the upper idler rollers 42 and the drive sprocket arrangement 13, the return run of the track belt 12 is guided on a further pair of idler rollers 58 spaced laterally on a transverse shaft 59 that is mounted in the snowmobile.

As shown in FIG. 3, the track 12 is driven by the sprocket arrangement and passes from there downwardly under the angled front end of the slide frame 14, rearwardly beneath the slide frame, upwardly and rearwardly parallel to the lower section 35 of the rear suspension arm assembly 16, upwardly and forwardly parallel to the upper section 34, and then horizontally and forwardly back to the drive sprocket arrangement 13. The belt runs in contact with the idler wheels 18, 19, 20, 40, 42 and 58, all of which are of the same diameter (equal to the root diameter of the sprocket arrangement 13) so that the length of the path of the belt does not vary with deflection of the suspension. It will be seen that the idler rollers 18, 19 and 20 project slightly below the underside of the slide rail 17 to maintain some degree of spacing of the belt 12 from the latter However under load conditions the belt 12 will contact the underside of the slide rail 17.

As mentioned, the geometrical arrangement of the front and rear arm assemblies are such that the length of the path followed by the track 12 is constant, even during load induced deflection of one or both of the suspension arm assemblies 15, 16.

Figure 4:
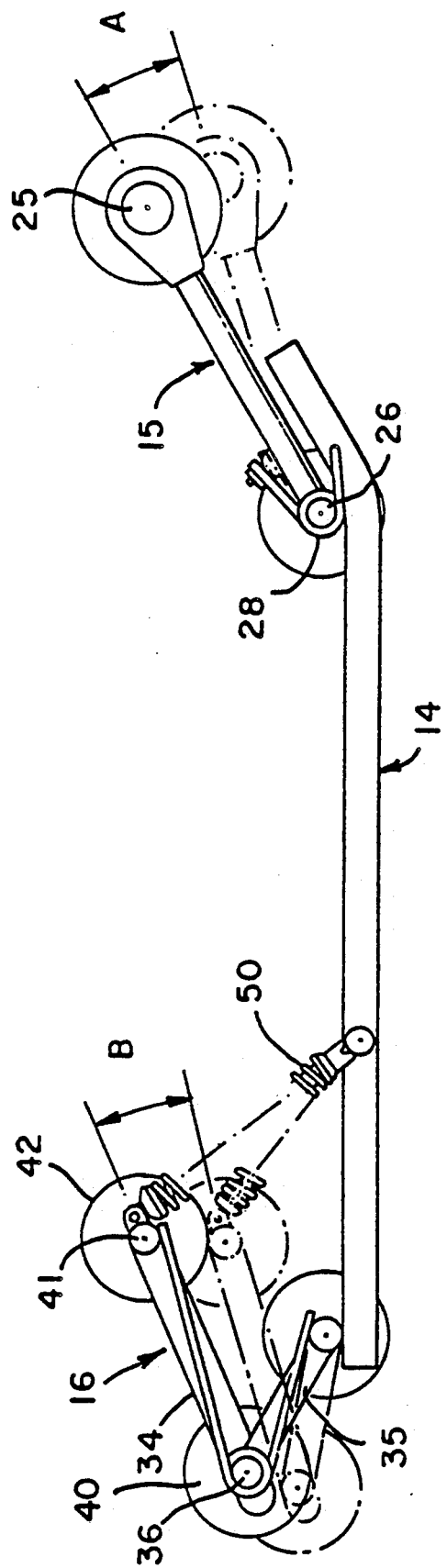
FIG. 4 is a schematic view illustrating the dynamic movement of the suspension system.

Such deflection is illustrated in broken lines in FIG. 4. As the drive shaft is deflected downwardly relative to the slide frame 14 (or vice versa) the arm assembly 15 is pivoted in a clockwise direction. The range of pivotal movement is indicated by the angle A, this movement being resisted by the torsion springs 28.

Similarly when the rear end of the snowmobile is deflected downwardly, the upper tube 41 is pivoted in a clockwise manner about the tube 36 as illustrated in broken lines in FIG. 4. The range of pivotal movement is indicated at B. Such deflection is resisted by compression of the shock absorbers 48 and by stressing of the torsion springs 55.

The track suspension system as described above and illustrated in the drawings offer numerous significant advantages over suspension system as heretofore employed. Since the length of the path followed by the track around the various idler rollers remains constant, there is zero stretching of the track in operation which leads to a lengthened life for the track.

In order to obtain zero track stretching, the following features as incorporated in the present suspension must be provided:
  (i) all of the wheels must be of the same diameter;
  (ii) the pivot axes of the suspension arms and sections must coincide with the wheel axes;
  (iii) the track must be directly supported by one of those wheels at each place where the track bends; and
  (iv) wheel axles are connected to all ends of the front and rear arms.

Likewise, since the track is not stretched, there is less suspension induced stress on the track during operation. Furthermore slippage of the sprocket with respect to the track, as can sometimes occur on standard snowmobile suspensions, is eliminated since the track at all times remains under constant tension and does not loosen.

The described articulation of the rear suspension assembly makes movement of the snowmobile in reverse easier, because of the capacity of local absorption of energy, and because the disposition of the lower section 35 of the suspension arm assembly 16 allows the snowmobile to rise above an obstacle instead of merely pushing against it when moving backwards.

Track tension is very easily adjusted by means of the screws 45 and the nuts 46, and the latter are preferably positioned so as to be readily accessible through the conventional sprocket drive holes which are provided in the track.

When track tension is increased to take up any slack that may have developed in the track over time, the necessary adjustment will involve a slight angular movement of the lower section 35 in the counter clockwise sense as seen in FIG. 5. This of course results in reduction to the inclination to the horizontal of this section 35. In prior art snowmobile suspensions including articulated rear suspension arms, adjustment to take up slack in the track (and therefore requiring an increase in track tension) involves increasing the angle of inclination relative to the horizontal of the lower section of the suspension arm. This increases the "angle of attack" of the track when driven in reverse, and thus severely hampers its ability to climb over obstacles. In contract, with the suspension as disclosed herein, such adjustment reduces the angle of attack and thus enhances operation in reverse.

One particular advantage of the disclosed suspension system is the ease with which track tension can be completely released, and the track removed or reinstalled. To effect this it is merely necessary to disconnect the fastener means 47 to uncouple the top end of the shock absorber 48 and to slacken the pivot bolts of the rear arm assembly 16. The tensioning idler rollers 40 can then be pushed forward, the rear end of the slide frame 14 moving downward (since the shock absorber 48 has been uncoupled) until the arm assembly 16 is first straightened and then becomes reversely bent. As soon as the latter occurs, the perimeter of the suspension is reduced, and the track becomes slack At this stage, the cap screws 41a can be removed from the walls of the track tunnel so that the rear part of the suspension is then completely freed. The upper ends 21a of the front suspension arm limbs 21 can then be pulled out of their sockets 24c where upon the suspension assembly is completely freed from the snowmobile.

The linkage perimeter of all prior snowmobile track suspensions simply could not be so dramatically reduced with so little work, and overall are much more difficult to disassemble than the suspension described and illustrated herein.

Overall the disclosed suspension is substantially less complex than previously used suspensions of a similar nature, involving a smaller number of parts and a lighter weight resulting in lower cost. Furthermore, the central area within the track is substantially unobstructed which reduces the tendency for snow to accumulate in this area. Such packing of snow in this region has proved to be a major problem on some snowmobile models.

Because of the reduced weight, the reaction time of the suspension is quicker and the non-suspended mass is less thus improving the response of the suspension to the dynamic operating conditions.

The suspension design is essentially symmetrical, the requirement for parts that are respectively right handed and left handed being minimized. This in turn simplifies manufacture and assembly, and gives a reduced requirement for spare parts inventory.

Where possible, the pivoting and rotational movements are accommodated by nylon bushings which eliminates maintenance such as greasing or cleaning as required in the more usual metal bushings previously employed.

What I claim as my invention is:

1. A snowmobile comprising a frame having a forward portion supported on steerable ski means and a rearward portion support on a track belt, said track belt following an endless loop that passes over a forwardly arranged drive sprocket means, through a lower, ground-engaging run to a rearwardly located idler wheel means, and back to the drive sprocket means through an upper return run, said snowmobile including:
   a track suspension formed by an elongate slide frame engaging said lower run of the track belt;
   a front suspension arm assembly pivotally connected between a forward portion of said slide frame and the snowmobile frame;
   a rear suspension arm assembly pivotally connected between the snowmobile frame and a rearward location on said slide frame
   springs acting on said front and rear suspension arm assemblies to urge said slide frame downwardly;
   wherein said rear suspension arm assembly comprises rearwardly angulated upper and lower sections that are pivotally interconnected at their adjacent ends and are pivoted at their opposite ends to the snowmobile frame and the slide frame respectively, said idler wheel means being supported on said rear suspension arm assembly to rotate on an axis in the area of the pivotal interconnectional said upper and lower sections thereof.

2. A snowmobile according to claim 1 wherein said front suspension arm assembly is pivotally attached to a shaft that is coaxial with said drive sprocket means.

3. A snowmobile according to claim 1 wherein tensioning idler wheel means is supported for rotation in an end of one of said angulated upper and lower sections of the rear suspension arm assembly and forms a pivotal connection with the end of the other said section, such pivotal connection being adjustable longitudinally of the end of said other section thereby to provide for adjustment of the tension in the track belt.

4. A snowmobile according to claim 3 wherein said tensioning idler wheel means is supported on a transverse shaft on said one section, said shaft passing through an elongate slot in said other section, screw-threaded adjustment means being arranged between said transverse shaft and said slot to enable tension adjustment of the track belt.

5. A snowmobile according to claim 1 wherein the geometrical arrangement of said front and rear suspension arm assemblies is such that during deflection of said track suspension no stretching of the neutral fiber of the track belt occurs.

6. A snowmobile according to claim 3 wherein additional idler means are positioned at the forward end of the slide frame and at the pivotal connection of the rear suspension arm assembly and the snowmobile frame, all such idler means being of the same diameter.

7. A snowmobile according to claim 1 wherein a shock absorber is provided extending angularly between the slide frame and a bracket attached to an upper end of the upper section of the rear suspension arm assembly.

* * * * *